P. F. ERB & C. F. BLOOM.
SUBSURFACE PACKING PLOW ATTACHMENT.
APPLICATION FILED OCT. 5, 1909.
987,053.
Patented Mar. 14, 1911.
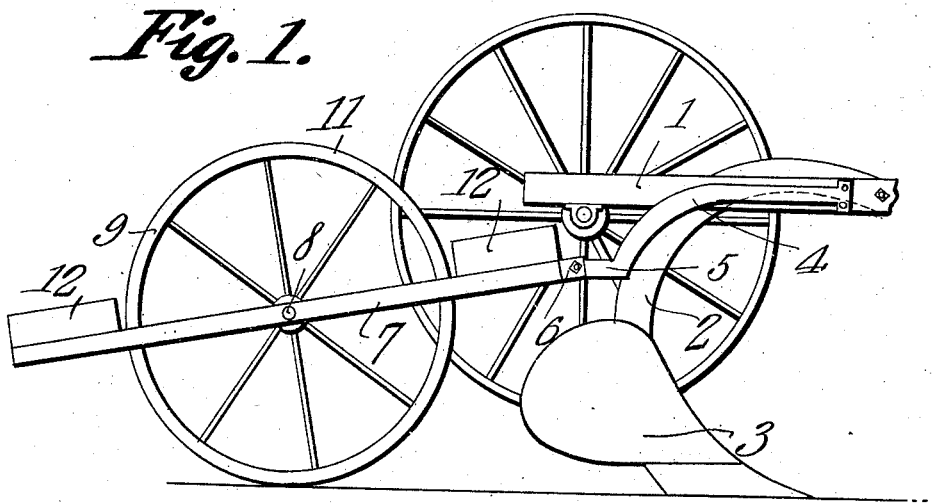
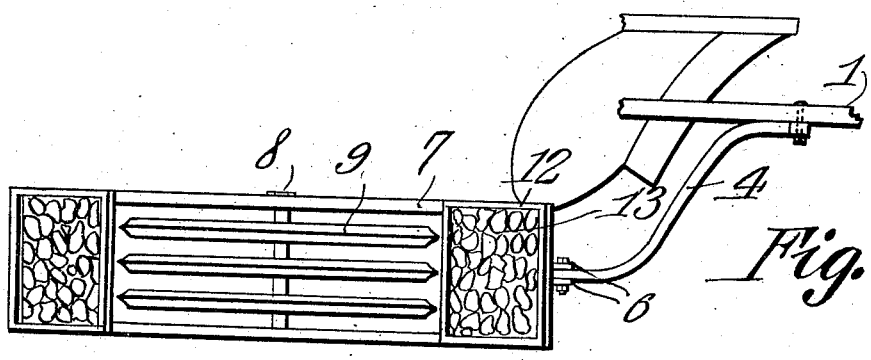
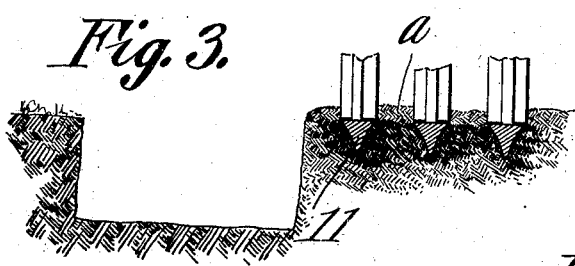

UNITED STATES PATENT OFFICE.

PETER F. ERB AND CLAUS F. BLOOM, OF ROSEGLEN, NORTH DAKOTA.

SUBSURFACE-PACKING PLOW ATTACHMENT.

987,053. Specification of Letters Patent. Patented Mar. 14, 1911.

Application filed October 5, 1909. Serial No. 521,043.

*To all whom it may concern:*

Be it known that we, PETER F. ERB and CLAUS F. BLOOM, citizens of the United States, residing at Roseglen, in the county of McLean, State of North Dakota, have invented a new and useful Subsurface-Packing Plow Attachment, of which the following is a specification.

This invention relates to attachments for plows, the principal objects of this invention being to provide a device of this character designed to be drawn back of a plow and on top of the upturned surface of the furrow slice, said attachment being so constructed as to pack the surface and subsurface and thus provide a firm bed for the planting of seed.

Another object is to provide a device of this character which is simple in construction and can be readily applied to any form of plow, means being utilized whereby the packing action of the attachment may be controlled.

With these and other objects in view the invention consists of certain novel details of construction and combinations of parts, hereinafter more fully described and pointed out in the claim.

In the accompanying drawings the preferred form of the invention has been shown.

In said drawings.—Figure 1 is a side elevation of a plow having the present improvements applied thereto. Fig. 2 is a plan view of the attachment. Fig. 3 is a transverse section on an enlarged scale, through the lower portion of the wheels of the attachment, and showing the action produced thereby upon the soil.

Referring to the figures by characters of reference, 1 designates the frame of a riding plow, the same having a standard 2 on which the plow 3 is fastened. Secured to the frame 1 is a rearwardly and downwardly extending arm 4 having an extension 5 to which are connected spaced ears 6 extending from the center of the front end of the frame 7 of the attachment constituting the present invention. This frame is preferably oblong and has a shaft 8 journaled in the central portion thereof and extending transversely therein. Mounted on this shaft 8 is a series of wheels 9 each of which is provided with a rim 11 having its side faces concave and converging toward the periphery of the wheel so as to exert a spreading or wedge-like action upon the soil against which it is forced. These wheels are comparatively narrow and are spaced apart so as to form ridges therebetween when the wheels are forced into the loosened soil. A box or receptacle 12 is mounted on each end of the frame 7, each being designed to hold weights 13 in the form of stones or the like.

In using the attachment herein described the arm 4 is first secured to the frame or beam 1 after which the ears 6 are pivotally connected to the extension 5 and desired weights placed within the boxes 12. When the plow is drawn forward and opens up its furrow, the wheels 9 will travel on top of the upturned surface of the furrow slice back thereof and will press downward in the loose soil contained in the furrow slice, the rims 11, by reason of their peculiar contours, operating as wedges for spreading the soil apart and packing it tightly as indicated in Fig. 3. The rims will press downward below the surface of the loose soil contained within the furrow slice and therefore ridges of loose soil and which have been indicated at *a* in Fig. 3, will be formed between the wheels so that, after the wheels have passed along the furrow slice, these ridges will fall downward into the furrows cut by the rims 11 and onto the packed subsurface. This subsurface constitutes an efficient bed for the planting of seed and conserves the moisture in the soil below.

Although three wheels have been shown within the frame 7, it is to be understood that any desired number may be utilized, this being dependent upon the width of the furrow slice. Although the attachment has been shown attached to an ordinary plow, the same may be attached to any desired form of plow or cultivator.

It is to be understood that various changes may be made in the construction and arrangement of the parts without departing from the spirit or sacrificing the advantages of the invention.

What is claimed is:—

The combination with a riding plow including a frame, of a rearwardly and downwardly extending arm secured to the frame and having an extension, a second frame, a pivotal connection between the extension and the front end of said frame, a shaft journaled upon said frame at the center thereof, spaced wheels supporting the shaft and having their peripheral portions beveled annularly to form peripheral edges, said wheels constituting sub-soil packing devices for riding on the slice turned by the plow to which the second frame is connected, and weight boxes arranged on the ends of said frame on the shaft, said wheels projecting between and above the weight boxes and said boxes substantially counter-balancing each other.

In testimony that we claim the foregoing as our own, we have hereto affixed our signatures in the presence of two witnesses.

PETER F. ERB.
CLAUS F. BLOOM.

Witnesses:
B. A. DICKINSON,
F. T. PERSINGER.

---

Copies of this patent may be obtained for five cents each, by addressing the "Commissioner of Patents, Washington, D. C."